Oct. 15, 1968  B. GUIDRY  3,405,472
SELF-PROPELLED FISHING GIG
Filed Feb. 8, 1965
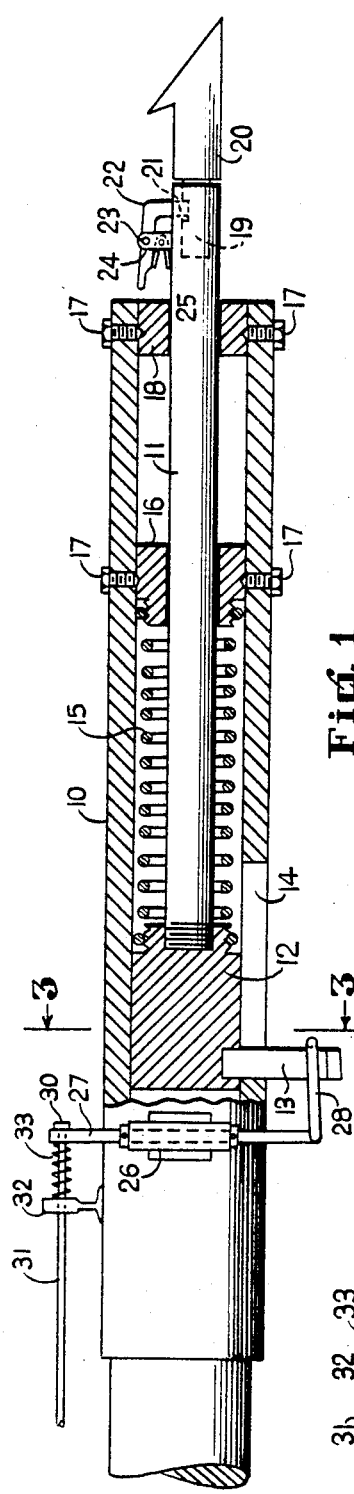
Fig. 1
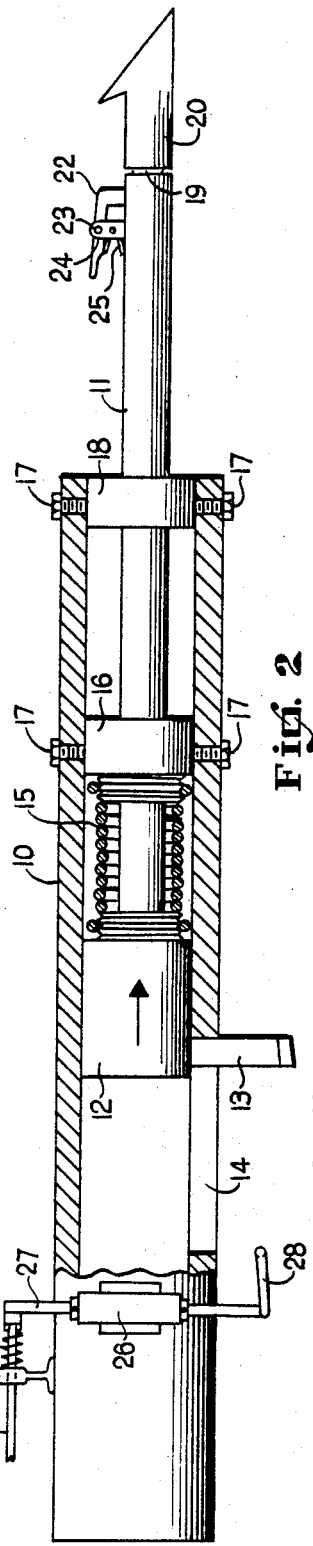
Fig. 2
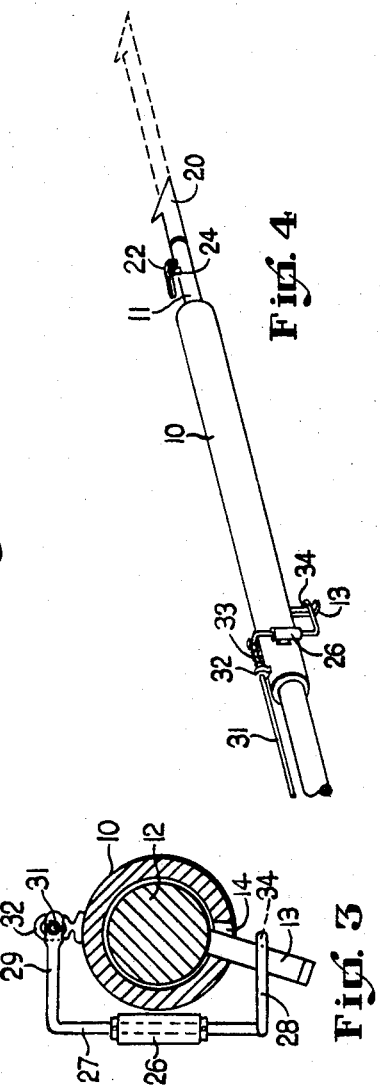
Fig. 4
Fig. 3
INVENTOR
*Bernard Guidry.*

United States Patent Office 3,405,472
Patented Oct. 15, 1968

3,405,472
SELF-PROPELLED FISHING GIG
Bernard Guidry, 2927 Ruby Drive,
Groves, Tex. 77619
Filed Feb. 8, 1965, Ser. No. 430,916
2 Claims. (Cl. 43—6)

ABSTRACT OF THE DISCLOSURE

A hollow elongated member partly housing a spring loaded mechanism which includes a shaft extending outward through one end of the member and a barbed end removably secured to the outer end of the shaft. The elongated member having an elongated opening for slidable receiving an arm secured to the spring loaded mechanism. A trigger mechanism secured to the outside of the elongated member is provided with a pivotally connected straight portion and bent end portions for holding and releasing the arm.

This invention relates to fishing gigs, a device that is defined in the dictionary as "a pronged instrument used for spearing fish."

Spearing fish is one of man's oldest ways of catching a fish. The first fishing gig was no doubt just a straight stick having one end sharpened to a point. Man's advancement throughout the ages has naturally resulted in the use of new and better materials, and improved ways of shaping one's materials, however, basically speaking there has been little true advancement in the fishing gig art until the event of the present invention.

The fishing gig is not to be limited to spearing of fish, but is an ideal instrument for the spearing of frogs and the like in brush or grass where other means of catching them are impractical because of the limited open space available for the throwing of an object or the aiming of a gun. In fact, it is this very limited use of any free throwing object that makes it necessary for one to have some form of a self-propelled instrument that can be effectively used for the relatively short distance one has to catch a frog or the like.

It is therefore the principal object of this invention to provide a self-propelled fishing gig that can effectively be used in a limited space, such as brush or grass.

Another object of this invention is to provide a self-propelled fishing gig that is activated entirely by a coil spring, which is manually triggered when one is ready to spear a frog or fish or the like.

Another object of this invention is to provide a self-propelled fishing gig with a removable barb.

Another object of this invention is to provide a self-propelled fishing gig that with the exception of the barb and trigger device, is totally enclosed within an aluminum tube.

Still another object of this invention is to provide a self-propelled fishing gig that can be manufactured to catch any size or weight of frog, fish or like object.

With these and other objects in view, the invention consists in the novel construction, arrangement and formation of parts, as will be hereinafter more specifically described and claimed, in the accompanying drawing, in which drawing, FIGURE 1 is a side view of this invention showing it partly in section with its mechanism in a loaded position.

FIGURE 2 is a view similar to that of FIGURE 1 but with its mechanism in a released or fired position.

FIGURE 3 is a vertically disposed sectional view of this invention taken substantially along line 3—3 of FIGURE 1 and viewed in the direction indicated by the arrow lines.

FIGURE 4 is a pictorial view of this invention with phantom lines showing the barb in a fired position.

Referring now to the accompanying drawing where like parts are indicated by like reference numbers in the several views, the reference number 10 indicating an aluminum tube in which is slidably located the shaft 11 having its rear end screwed into shaft and spring holder 12 that is provided with an outwardly extending arm 13 which projects through the elongated opening 14 that is in one side of the aforesaid aluminum tube 10. The cocking spring 15 has one end secured to the already mentioned spring holder 12 and the other end secured to the center bushing and spring holder 16 that is firmly secured within the aforesaid aluminum tube 10 by means of two set screws 17 that are located one diametrically opposite the other. A front bushing 18 is likewise secured in the front end of the aluminum tube 10. Looking now at the front end of this invention it will be seen that the outward end of the shaft 11 is provided with a recess in which is located the shank 19 of the barbed end 20. The shank 19 is provided with a recess in which normally rest one end 21 of the L-shaped barb release 22 that is hingedly secured to the front end of the aforesaid shaft 11 by the pin 23 passing through the lug 24. The U-shaped spring 25 that is mounted under one leg of the L-shaped barb release 22 keeps the aforesaid end 21 of the release in the locking position shown in FIGURE 1 of the accompanying drawing.

Continuing to look at the accompanying drawing it will be seen that this invetion is provided with a trigger device embodying a short tube 26 that is mounted vertically on one side of the aforesaid aluminum tube 10. A rigid wire 27 or its equivalent is swingably supported by the aforesaid short tube 26. The lower end or inturned tip 34 and horizontally disposed portion 28 of the wire 27 normally rest against one side of the aforesaid arm 13 while the upper horizontally disposed portion 29 of the same wire 27 is suitably secured to one end 30 of the rod 31 that passes through the rod-guide 32 that is located on top of the aforesaid aluminum tube 10. A spring 33 that encircles the end of the rod 31 between the rod-guide 32 and the wire 27 keeps this wire which is actually a trigger in the locked position until the rod is pushed by the operator of this fishing gig that I have invented. When the aforesaid rod 31 is pushed and the trigger wire 27 releases the arm 13 of the spring hodler 12 the previously described spring loaded mechanism will naturally propel the shaft 11 and the barb 20 that is secured to the outermost end thereof forward and the barb will enter whatever object it is being pointed towards at the time of its activation. To reset the gig all one has to do is to grasp the aforesaid shaft 11 just rearward of the barbed end 20 and pull it back as far as it will go thus causing the arm 13 to automatically become engaged with the inturned tip 34 of the aforesaid horizontally disposed portion 28 of the wire 27. The inturned tip 34 is best shown in FIGURE 4 of the drawing.

Having now described both the construction and operation of the preferred form of my invention of a self-propelled fishing gig, I want it understood that this invention is subject to any change in detailed design, and arrangement of parts that can be made by those experienced in the art in so long as all changes come within the spirit and intent of the appended claims.

What I now claim is:

1. A self-propelled fishing gig of the character described, comprising an aluminum tube; spring loaded mechanism partly enclosed within the said aluminum tube and extending outward through one end of the said aluminum tube; a barbed end removably secured to the outer end of the said mechanism; and a rigid wire trigger having a straight portion with its midpoint swingably mounted substantially vertically on one side of the said aluminum tube, said straight portion extending tangentially to said tube, a rod extending along the top of the said aluminum tube and slidably secured thereto, the upper end of the straight portion being bent to extend transversely to the tube and secured at its end to one end of said rod, the tube having an elongated axially extending opening in the lower portion thereof, an arm secured to said spring loaded mechanism and extending through said elongated opening, the lower end of said straight portion being bent to extend along the elongated opening with its end portion bent to extend across said elongated opening, said bent end to hook over the outer portion of said arm, the forward pushing of the said rod releasing the bent end of the said trigger from the said arm which is now pulled away from the said trigger thereby causing the barb to enter that at which it is being pointed.

2. A self-propelled fishing gig of the character described, comprising an aluminum tube; spring loaded mechanism which embodies a shaft, a spring holder removably secured within the said aluminum tube, a front bushing mounted within the front end of the said aluminum tube, the said shaft slidably passing through a centrally located opening in both the said spring holder and the said bushing, and a second spring holder, the said second spring holder being secured to the inward end of the said shaft, and a cocking spring encompassing the said shaft between the two spring holders to which it is secured, said shaft partly enclosed within the said aluminum tube and extending outward through one end of the said aluminum tube; a barbed end removably secured to the outer end of the said shaft; and a rigid wire trigger having a straight portion with its midpoint swingably mounted substantially vertically on one side of the said aluminum tube, the straight portion extending tangentially to said tube, a rod extending along the top of the said aluminum tube and slidably secured thereto, the upper end of the straight portion being bent to extend transversely to the tube and secured at its end of said rod, the tube having an elongated, axially extending opening in the lower portion thereof, an arm secured to said spring-loaded mechanism and extending through said elongated opening, the lower end of said straight portion being bent to extend along the elongated opening with its end portion bent to extend across said elongated opening, said bent end to hook over the outer portion of said arm, the forward pushing of the said rod releasing the bent end of the said trigger from the said arm which is now pulled away from the said trigger thereby causing the barb to enter that at which it is being pointed.

References Cited
UNITED STATES PATENTS

| | | | |
|---|---|---|---|
| 720,137 | 2/1903 | Harris. | |
| 1,297,344 | 3/1919 | Glass | 43—6 |
| 1,727,812 | 9/1929 | David | 43—6 |
| 2,194,016 | 3/1940 | Geller | 43—6 |
| 2,442,974 | 6/1948 | Frederiksen | 43—6 |

FOREIGN PATENTS 486,397   11/1953   Italy.

WARNER H. CAMP, *Primary Examiner.*